(12) United States Patent
Sekiya

(10) Patent No.: US 8,977,824 B2
(45) Date of Patent: Mar. 10, 2015

(54) PORTABLE ELECTRONIC APPARATUS AND METHOD OF CONTROLLING A PORTABLE ELECTRONIC APPARATUS

(75) Inventor: Satoshi Sekiya, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 110 days.

(21) Appl. No.: 13/033,640

(22) Filed: Feb. 24, 2011

(65) Prior Publication Data

US 2011/0231617 A1 Sep. 22, 2011

(30) Foreign Application Priority Data

Mar. 18, 2010 (JP) ................................. 2010-063324

(51) Int. Cl.
*G06F 12/00* (2006.01)
*G06F 12/04* (2006.01)
*G06F 12/10* (2006.01)

(52) U.S. Cl.
CPC ................ *G06F 12/04* (2013.01); *G06F 12/10* (2013.01)
USPC ........................................................ 711/156

(58) Field of Classification Search
CPC ........ H04W 65/00; G06K 19/06; G06F 12/10
See application file for complete search history.

(56) References Cited

U.S. PATENT DOCUMENTS

| 6,775,245 B1 | 8/2004 | Ishida et al. |
| 2002/0139861 A1 | 10/2002 | Matsumoto et al. |
| 2006/0253465 A1 | 11/2006 | Willis et al. |

FOREIGN PATENT DOCUMENTS

| EP | 1 544 809 A2 | 6/2005 |
| EP | 1 770 659 | 4/2007 |
| JP | 63-004486 | 1/1988 |
| JP | 11-272809 | 10/1999 |
| JP | 2000-276560 | 10/2000 |
| JP | 2007-102312 | 4/2007 |
| WO | WO 2007/004525 | 1/2007 |
| WO | WO 2008/078217 A2 | 7/2008 |

OTHER PUBLICATIONS

ISO/IEC 7816-4; http://www.iso.org/iso/iso_catalogue/catalogue_tc/catalogue_detail.htm?csnumber=3; Identification cards, Integrated circuit cards, Part 4: Organization, security and commands for interchange; Second edition; Jan. 15, 2005.
Singapore Office Action dated Jan. 10, 2012.
Japanese Office Action dated Jun. 12, 2012.
European Search Report dated Aug. 2, 2011.

*Primary Examiner* — Baboucarr Faal
(74) *Attorney, Agent, or Firm* — Oblon, McClelland, Maier & Neustadt, L.L.P.

(57) ABSTRACT

According to one embodiment, a portable electronic apparatus executing performing process based on command input from an external apparatus, and storing a plurality of TLV data objects, the apparatus includes, a storage unit configured to store the data class and data character of each TLV data object, respectively in two storage areas spaced apart from each other, and to store addresses of a fixed length, representing the positions of the data characters, in association with the each data classes.

4 Claims, 5 Drawing Sheets

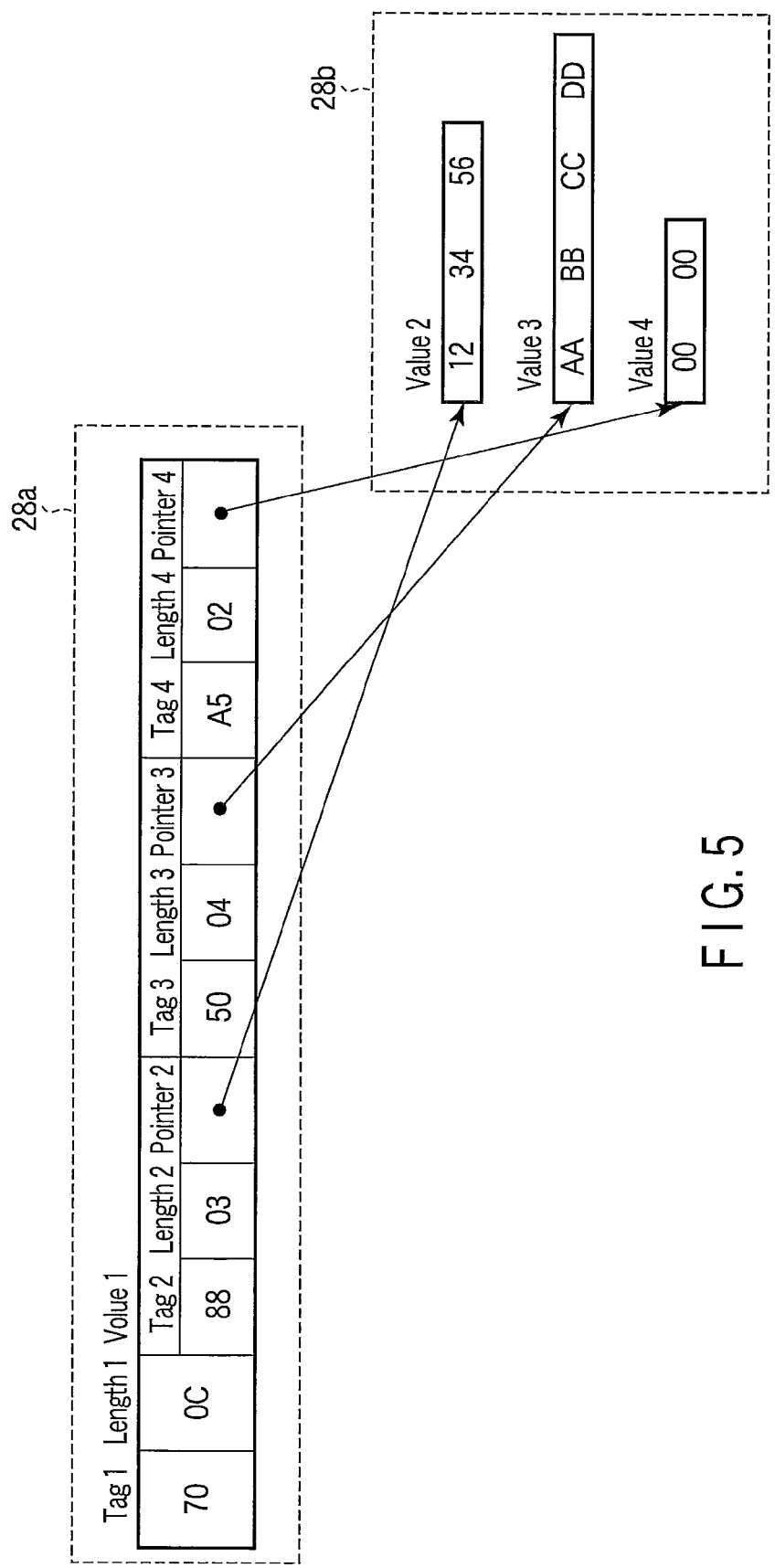
F I G. 5

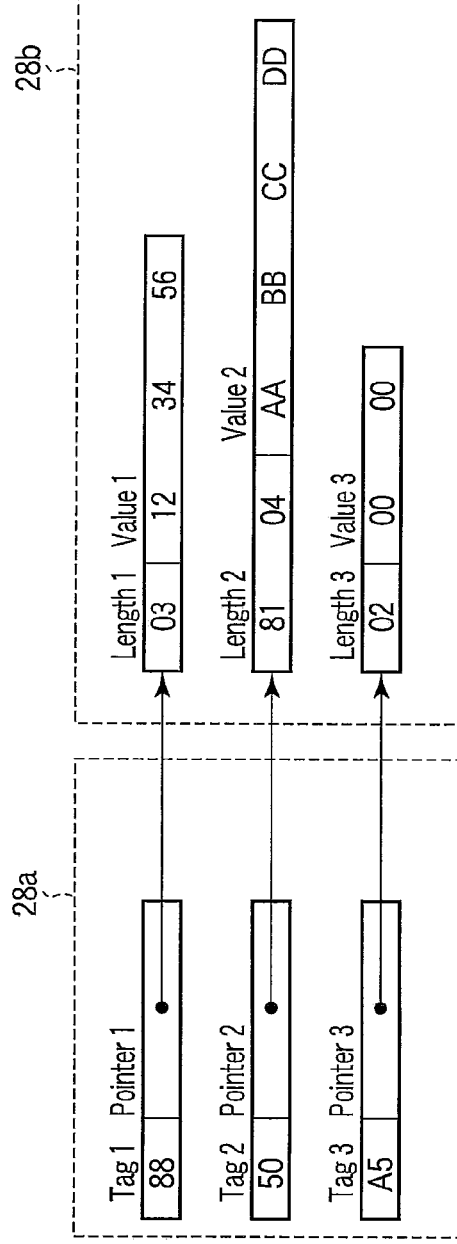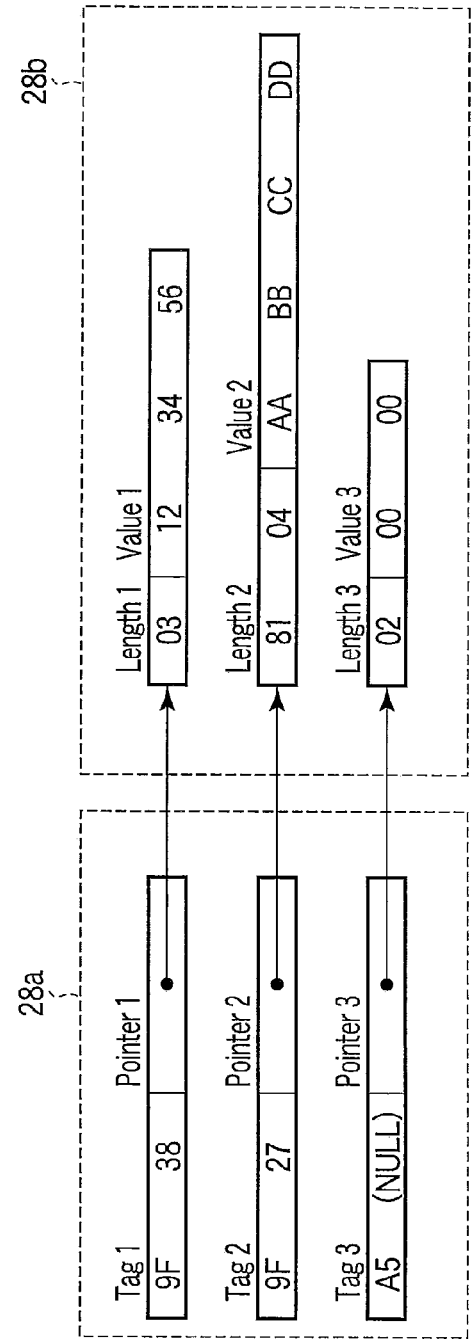
F I G. 6
F I G. 7

PORTABLE ELECTRONIC APPARATUS AND METHOD OF CONTROLLING A PORTABLE ELECTRONIC APPARATUS

CROSS-REFERENCE TO RELATED APPLICATIONS

This application is based upon and claims the benefit of priority from Japanese Patent Application No. 2010-063324, filed Mar. 18, 2010; the entire contents of which are incorporated herein by reference.

FIELD

Embodiments described herein relate generally to a portable electronic apparatus and a method of controlling a portable electronic apparatus.

BACKGROUND

Most IC cards used as portable electronic apparatuses have a main body and an IC module. The main body is made of plastics and shaped like a card. The IC module is embedded in the main body and has an IC chip. The IC chip has a nonvolatile memory, a volatile memory, and a CPU. The nonvolatile memory that can hold data even if it is not supplied with power is, for example, an electrically erasable programmable read-only memory (EEPROM) or a flash ROM. The volatile memory is, for example, a RAM. The CPU performs various operations.

The IC card is one that accords with the International Standards ISO/IEC7816. The IC card has a master file (MF), which is the basis of the file structure and which is stored in the nonvolatile memory. The IC card also has a dedicated file (DF), which is a lower file with respect to the MF and is used to group applications or the like. The IC card further has an elementary file (EF), which is a lower file with respect to the MF or the MF and is used to hold various data items.

The International Standards ISO/IEC7816 defines a file structure for the MF, DF and EF, or tag-length value (TLV) type data (TLV data object). The TLV data object has data class (Tag), data length (Length) and data character (Value).

Tag of the TLV data object is a data item the CPU of the IC card uses to identify the class of the TLV data object. Length of the TLV data object is a data item that represents the length of Value of the TLV data object. Value is the main part of the TLV data object.

The International Standards ISO/IEC7816-4, cited herein as Non-Patent Document 1, defines various commands designating processes to be performed on the IC card. One of these commands is GET DATA command that is used to read any desired TLV data object from the file.

The GET DATA command has a data item (designation data) that designates a TLV data object. On receiving the GET DATA command, the IC card retrieves from the file the TLV data object that has a Tag identical to the designation data contained in the GET DATA command.

However, the TLV data object does not have a prescribed length. It inevitably takes much time to retrieve any data desired. If the file contains a plurality of TLV data objects coupled one to another, the CPU of the IC card collates the designation data with the Tag stored at the head of the storage area.

If the Tag stored at the head of the storage area is not identical to the designation data is not identical, the CPU moves the data pointer (reading position) by the distance represented by the Length recorded after the Tag. The CPU then collates the designation data with the Tag stored at the position to which the data pointer has been moved. The CPU repeats this sequence of process until it finds Tag identical to the designation data.

BRIEF DESCRIPTION OF THE DRAWINGS

FIG. 5 is a diagram explaining an IC card according to the embodiment;

FIG. 6 is a diagram explaining an IC card according to the embodiment;

FIG. 7 is a diagram explaining an IC card according to the embodiment; and

DETAILED DESCRIPTION

In general, according to one embodiment, a portable electronic apparatus executing performing process based on command input from an external apparatus, and storing a plurality of TLV data objects, the apparatus comprises; a storage unit configured to store the data class and data character of each TLV data object, respectively in two storage areas spaced apart from each other, and to store addresses of a fixed length, representing the positions of the data characters, in association with the each data classes.

A portable electronic apparatus and a method of controlling a portable electronic apparatus, both according to an embodiment, will be described in detail, with reference to the accompanying drawings.

Figure 1:
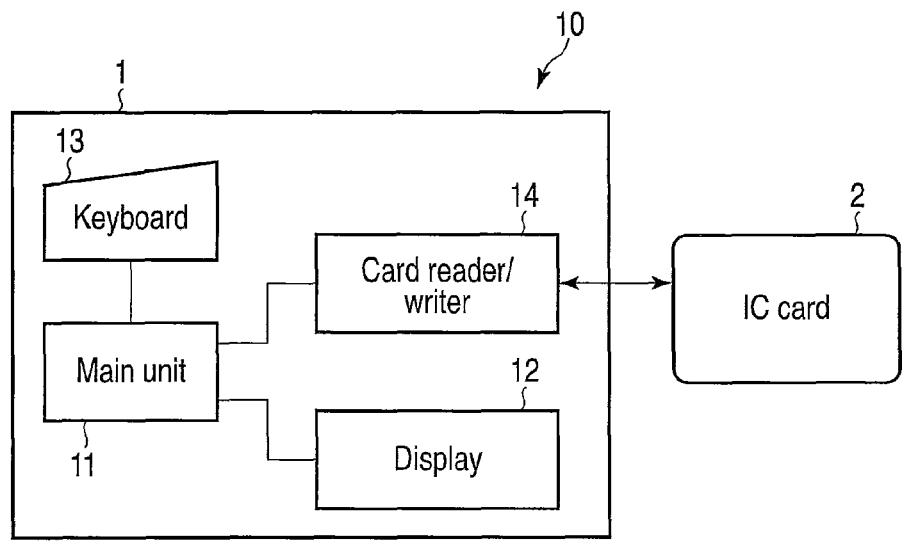
FIG. 1 is a diagram explaining the processing system of a portable electronic apparatus according to an embodiment.

FIG. 1 is a block diagram explaining an IC card processing apparatus 1 according to an embodiment, which can communicate with an IC card 2.

As shown in FIG. 1, the IC card processing apparatus 1 has a main unit 11, a display 12, a keyboard 13, and a card reader/writer 14.

The main unit 11 has a CPU, various memories, and various interfaces. The main unit 11 is configured to control the other components of the IC card processing apparatus 1.

The display 12 can display various types of information when it is controlled by the main unit 11. When operated by the user of the IC card processing apparatus 1, the keyboard 13 generates operation signals.

The card reader/writer 14 is an interface device that can perform communication with the IC card 2. The card reader/writer 14 can achieve either contact communication or contactless communication, with the IC card 2.

If the card reader/writer 14 is designed to achieve contact communication, it has a connection unit that can be electrically connected to the contact terminal of the IC card 2. If the card reader/writer 14 is designed to achieve contactless communication, it has an antenna that can be magnetically connected to the antenna of the IC card 2. The card reader/writer 14 supplies power and a clock signal to the IC card 2, performs reset control on the IC card 2, and transmits and receives data to and from the IC card 2.

The main unit 11 inputs various commands to the IC card 2 via the card reader/writer 14. The card reader/writer 14 may supply a data write command to the IC card 2. In this case, the data supplied to the IC card 2 is written into the nonvolatile memory incorporated in the IC card 2.

The main unit 11 transmits a read command to the IC card 2, reading data from the IC card 2. On the basis of the data received from the IC card 2, the main unit 11 performs various processes. For example, the main unit 11 transmits a GET DATA command to the IC card 1, in order to read the TLV data object stored in the nonvolatile memory of the IC card 2.

Figure 2:
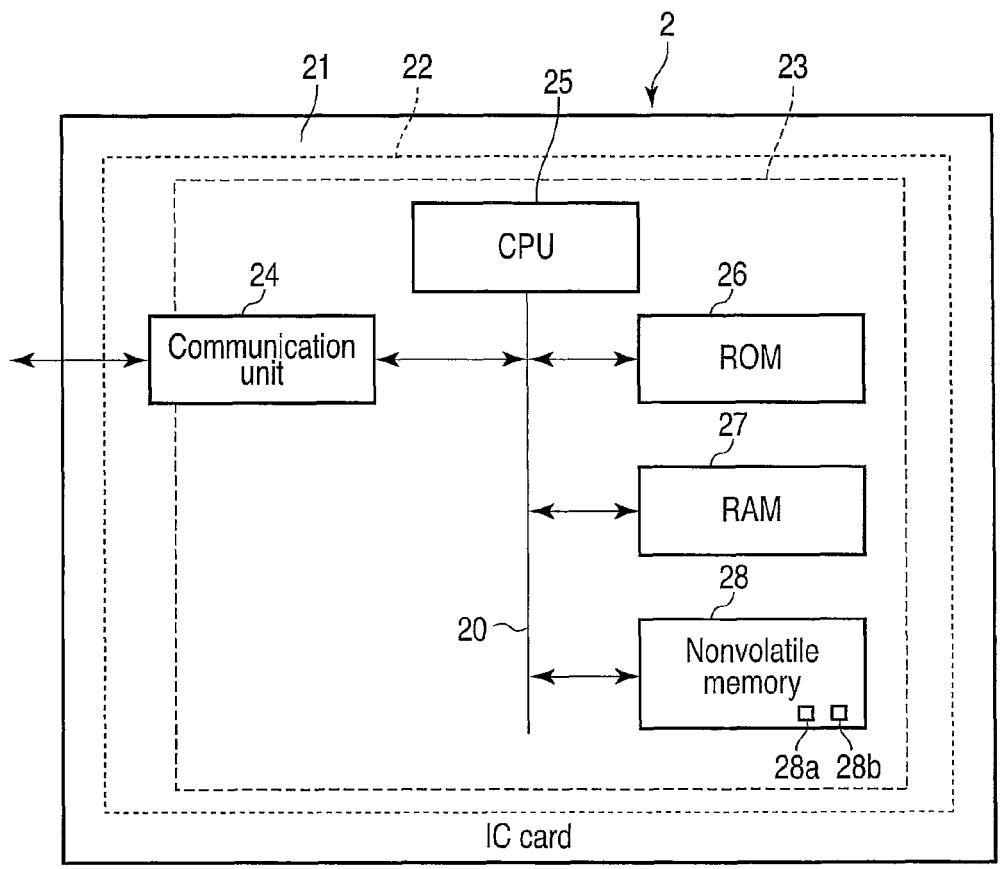
FIG. 2 is a diagram explaining an IC card according to the embodiment.

FIG. 2 is a block diagram explaining an exemplary configuration that the IC card 2 shown in FIG. 1 may have.

As shown in FIG. 2, the IC card 2 has a card-shaped main body 21 and an IC module 22 incorporated in the main body 21. The IC module 22 comprises one or more IC chips 23 and a communication unit 24. The IC chip 23 and the communication unit 24 are connected to each other In the IC module 22.

The IC chip 23 incorporates a data bus 20, a communication unit 24, a CPU 25, a ROM 26, a RAM 27, and a nonvolatile memory 28. The data bus 20 connects the communication unit 24, CPU 25, ROM 26, RAM 27 and nonvolatile memory 28, one to another.

If supplied with power from a higher device, such as IC card processing apparatus 1, the IC card 2 operates. The IC card 2 then performs either contact communication or contactless communication with the IC card processing apparatus 1.

The communication unit 24 is an interface configured to communicate with the card reader/writer 14 of the IC card processing apparatus 1.

The communication unit 24 may comprise a contact unit, which may contact the card reader/writer 14 of the IC card processing apparatus 1, to transmit and receive signals to and from the card reader/writer 14. In this case, the IC card 2 functions as a contact-type IC card.

The communication unit 24 may further comprise an antenna, which achieves wireless communication with the card reader/writer 14 of the IC card processing apparatus 1. If this is the case, the IC card 2 functions as a contactless-type IC card.

To perform contact communication with the IC card processing apparatus 1, the IC card 2 receives power and an operating clock signal from the IC card processing apparatus 1 through the contact unit. The IC card 2 is therefore activated.

To perform contactless communication with the IC card processing apparatus 1, the IC card 2 receives an electric wave from the IC card processing apparatus 1 through an antenna. In the IC card 2, power is generated from the electric wave. Hence, the IC card 2 is activated.

The CPU 25 functions as a control unit that controls the other components of the IC card 2. The CPU 25 performs various processes in accordance with the control programs and the control data that are stored in the nonvolatile memory 28.

The ROM 26 is a nonvolatile memory that stores control programs, control data and the like. The ROM 26 has been incorporated into the IC chip 23, with the control programs and control data stored in it, during the manufacture of the IC card 2. That is, the ROM 26 had stored the control programs and the control data in accordance with the specification of the IC card 2, before it was incorporated into the IC card 2.

The RAM 27 is a volatile memory that functions as a working memory. The RAM 27 temporarily stores the data the CPU 25 is processing. For example, it stores, for example, the data received from the IC card processing apparatus 1 through the communication unit 24. The RAM 27 also temporarily stores the program the CPU 25 is executing.

The nonvolatile memory 28 is, for example, an EEPROM or a flash ROM in which data can be written or rewritten. The nonvolatile memory 28 stores control programs, applications and various data items, in accordance with the use of the IC card 2. The CPU 25 executes the programs stored in the ROM 26, performing various processes.

The nonvolatile memory 28 has a memory structure composed of the MF, DF and EF that were generated at the time of issuing the IC card 2. The DF and the EF hold a program file or a data file.

Each file stored in the nonvolatile memory 28 shown in FIG. 2 has a first storage area 28a and a second storage area 28b. Each file further holds attribute data that represents the structure of the data held in the file.

The first storage area 28a holds the address (e.g., pointer) of the storage area in which at least Tag and Value of the TLV data object are stored. The second storage area 28b holds the data (i.e., data value) of Value of the TLV data object.

Figure 3:
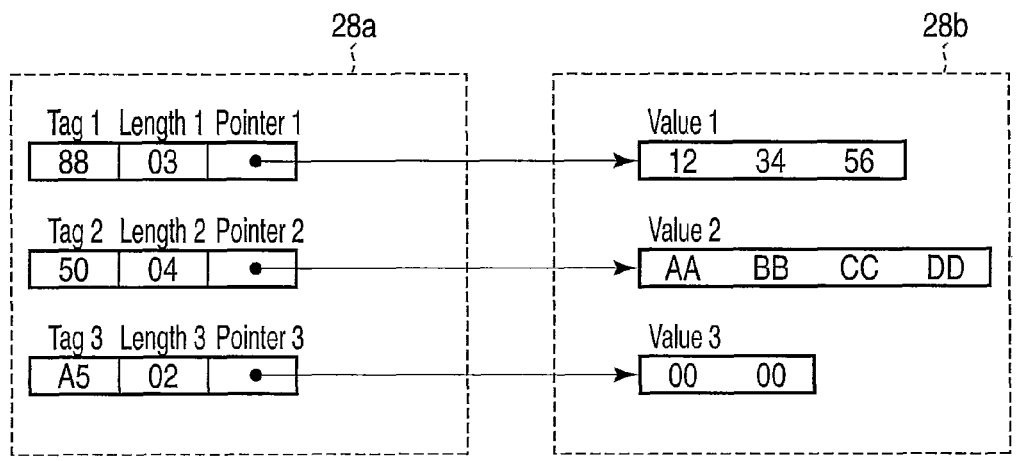
FIG. 3 is a diagram explaining an IC card according to the embodiment.

FIG. 3 is a diagram explaining the process the IC card 2 of FIG. 2 performs, and showing the information stored in the nonvolatile memory 28.

If the IC card 2 receives a command for writing the TLV data object, the CPU 25 of the IC card 2 writes the data value of Value in the second storage area 28b of the file.

The CPU 25 also writes Tag and Length in the first storage area 28a. Further, the CPU 25 writes the address (pointer) for specifying the position where the data value of Value has been written, at the back of Length written in the first storage area 28a.

The CPU 25 writes, as address, the head address of the data value of Value written in the second storage area 28b.

The CPU 25 may be configured to write, as address, the offset value between the position at which to write the address and the position at which the data value of Value has been written in the second storage area 28b. Alternatively, the CPU 25 may be configured to write, as address, the offset value between the head of the file and the position at which the data value of Value has been written in the second storage area 28b.

Assume that Tag, Length and the address (pointer) have prescribed lengths (each defined as a number of bytes), respectively. Then, the CPU 25 stores Tag, Length and pointer, each defined by a number of bytes, as attribute data items, in the file that is stored in the nonvolatile memory 28.

On receiving a GET data command from the IC card processing apparatus 1, the CPU 25 of the IC card, in which the nonvolatile memory 28 now stores the information shown in FIG. 3, retrieves the TLV data object designated by the GET DATA command. The GET DATA command may designates "A5." In this case, the CPU 25 retrieves Tag identical to "A5" from the first storage area 28a.

In response to the GET DATA command, the CPU 25 reads data of a prescribed length, from the head of the file. That is, the CPU 25 reads Tag 1 having the prescribed length and stored in the file, from the head thereof.

The CPU 25 collates the value of Tag 1 with the value of designation data. As shown in FIG. 3, Tag 1 has value of "88," whereas the designation data has value of "A5." The CPU 25 therefore determines that the value of Tag 1 differs from that of the designation data. In this case, the CPU 25 moves the data pointer (i.e., reading position) by the distance equivalent to a specific number of bytes. More precisely, the CPU 25 moves the pointer forwards, by Length 1 contained in the attribute data and the number of bytes for the pointer. Thus, the CPU 25 can easily specify the position where Tag 2 is stored next to Tag 1.

The CPU 25 reads data of a prescribed length from the position the data pointer specifies. That is, the CPU 25 reads Tag 2 stored and extending from the data pointer for a prescribed distance. The CPU 25 collates the value of Tag 2 thus read, with the value of the designation data. As shown in FIG. 3, the value of Tag 2 is "50," and that of the designation data is "A5." Hence, the CPU 25 determines that Tag 2 differs from the designation data in terms of value. In this case, the CPU 25 move the data pointer (reading position) forwards, by Length 2 and the number of bytes for the pointer.

The CPU 25 reads the data of the prescribed length from the position the data pointer represents. To be more specific, the CPU 25 reads Tag 3 stored and extending from the data pointer for a prescribed distance. The CPU 25 collates the value of Tag 3 thus read, with the value of the designation data. As shown in FIG. 3, the value of Tag 3 is "A3," and that of the designation data is "A5." Hence, the CPU 25 determines that Tag 3 is identical to the designation data in terms of value.

In this case, the CPU 25 reads the value of Length 3 stored at the back of Tag 3. The CPU 26 also reads the value of pointer 3 stored at the back of Length 3. In accordance with the value of the pointer 3, the CPU 25 moves the data pointer. The CPU 25 reads data (Value 3) composed of that number of bytes, which Length 3 represents.

The CPU 25 generates response data from the value of Value thus read. The CPU 25 then transmits the response data to the card reader/writer 14 through the communication unit 24.

Figure 4:
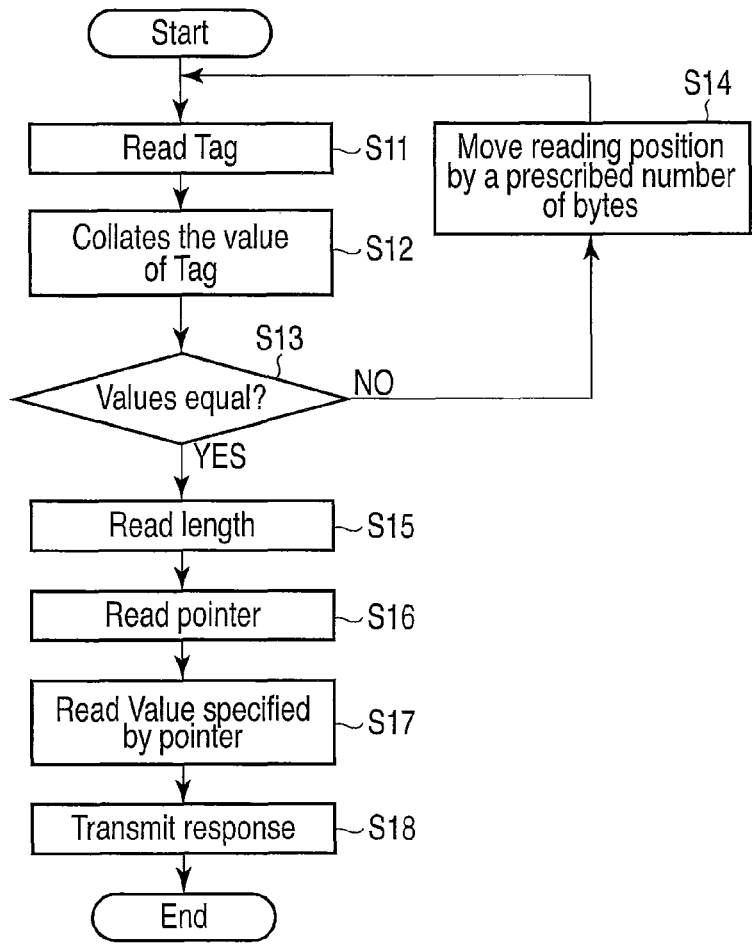
FIG. 4 is a diagram explaining an IC card according to the embodiment.

FIG. 4 is a flowchart explaining how the TLV data object is read in the IC card 2 of FIG. 2.

On receiving a GET DATA command from an external apparatus, the CPU 25 of the IC card 2 reads Tag stored and extending for a prescribed distance from the head of the file (Step S11).

The CPU 25 collates the value of Tag, thus read, with the value of the designation data contained in the GET DATA command (Step S12). Then, the CPU 25 determines whether the value of Tag is equal to the value of the designation data (Step S13).

If the value of Tag differs from that of the designation data (NO in Step S13), the CPU 25 moves the reading position forward, by a distance equivalent to a prescribed number of bytes (Step S14). The CPU 25 then return to Step S11. Note that the CPU 25 moves the data pointer by the distance equivalent to the sum of the bytes defining Length contained in file attribute data and the bytes defining the pointer. The CPU 25 repeats the sequence of Steps S11 to S14 until Tag identical to the designation data is retrieved.

If the value of Tag is equal to that of the designation data (YES in Step S13), the CPU 25 reads Length stored immediately after Tag (Step S15). Further, the CPU 25 reads the pointer stored immediately after Length (Step S16).

The CPU 25 moves the data pointer in accordance with the value of the pointer. Then, the CPU 25 reads Value from the position the data pointer specifies (Step S17). That is, the CPU 25 reads the data defined by the bytes, the number of which is equivalent to Length read, from the position the data pointer specifies.

The CPU 25 generates response data from the value of Value thus read. The CPU 25 then transmits the response data to the card reader/writer 14 through the communication unit 24 (Step S18).

In the IC card 2 according to this embodiment, the CPU 25 stores, in the first storage area 28a, the address representing the position where Tag, Length and Value are stored. The CPU 25 further stores the data representing Value in the second storage area 28b. Hence, Tag, Length, and the address, all stored in the first storage area 28a, can have prescribed lengths, respectively.

Therefore, the CPU 25 can automatically determine the position at which Tag is stored in the first storage area 28a. More precisely, the CPU 25 can specify the position where Tag is stored, without reading the value of Length, in order to retrieve Tag in accordance with the data the command designates.

The CPU 25 can therefore shorten the time required for retrieving the TLV data objects. As a result, a portable electronic apparatus and a method of controlling the portable electronic apparatus can be provided, in which processes can be efficiently performed in response to commands.

Value may contain a plurality of TLV data objects. If this is the case, the nonvolatile memory 28 stores such information as shown in FIG. 5.

FIG. 5 is a diagram explaining another process performed in the IC card 2 of FIG. 2.

The IC card 2 may receive a command for writing a TLV data object (higher TLV object) having Value that contains a plurality of TLV data objects (lower TLV data objects). In this case, the CPU 25 of the IC card 2 writes such data as shown in FIG. 5.

More precisely, the CPU 25 writes the data values of Value of the lower TLV data objects in the second storage area 28b.

The CPU 25 further writes Tag and Length of the higher TLV data object in the first storage area 28a.

Moreover, the CPU 25 replaces Value of the lower TLV data object with the address specifying the position at which the data value of Value has been written. The CPU 25 then writes the lower TLV data object, Value of which has been so replaced, at the position of Value of the higher TLV data object.

Assume that Tag, Length and address of the TLV data object stored in the first storage area 28a have fixed lengths, respectively. The number of bytes constituting Tag, the number of bytes constituting Length, and the number of bytes constituting the pointer are stored, as attribute data, in the file held in the nonvolatile memory 28. The data showing that Value of the higher TLV data object has lower TLV data objects is also stored, as attribute data, in the nonvolatile memory 28.

To select a file, the CPU 25 confirms the attribute data held in the file. The CPU 25 can therefore recognize that Value of the higher TLV data object has lower TLV data objects.

Further, the CPU 25 examines the attribute data, determining the lengths of Tag, Length and address. That is, the CPU 25 confirms the data length of each lower TLV data object. When the CPU 25 confirms Length of the higher TLV data object, it can recognize how many lower TLV objects are contained in the higher TLV data object.

The CPU 25 of the IC card 2 in which the nonvolatile memory 28 stores the data shown in FIG. 5 may receive, from the IC card processing apparatus 1, a GET DATA command designating "A5." In this case, the CPU 25 retrieves TLV data object whose Tag value is "A5."

That is, the CPU 25 reads Tag 1 from the head of the file. Then, the CPU 25 collates the value of Tag 1 with the value of the designation data. As shown in FIG. 5, Tag 1 has value "70," and the designation data has value "A5." Therefore, the CPU 25 determines that the value of Tag 1 is not equal to that of the designation data.

The CPU 25 therefore moves the data pointer to the next tag, i.e., Tag 2. That is, the CPU 25 does not read Length 1, on the basis of the length of Length previously recognized.

The CPU 25 then reads Tag 2. The CPU 25 collates the value of Tag 2 with the value of the designation data. As shown in FIG. 5, Tag 2 has value "88," and the designation data has value "A5." The CPU 5 therefore determines that the value of Tag 2 is not equal to that of the designation data.

In this case, the CPU 25 moves the data pointer to the next tag, i.e., Tag 3. That is, the CPU 25 does not read Length 1 or Length 2, on the basis of the length of Length or pointer 2, both previously recognized.

Next, the CPU 25 reads Tag 3. The CPU 25 collates the value of Tag 3 with the value of the designation data. As shown in FIG. 5, Tag 3 has value "50," and the designation data has value "A5." The CPU 5 therefore determines that the value of Tag 3 is not equal to that of the designation data.

The CPU 25 therefore moves the data pointer to the next tag, i.e., Tag 4. That is, the CPU 25 does not read Length 3 or pointer 3, on the basis of the length of Length and the length of the address, both previously recognized.

Further, the CPU 25 reads Tag 4. The CPU 25 collates Tag 4 with the value of the designation data. As shown in FIG. 5, Tag 5 has value "A5," and the designation data has value "A5." The CPU 5 therefore determines that the value of Tag 3 is equal to that of the designation data.

In this case, the CPU 25 reads the value of Length 4 stored at the back Tag 4. The CPU 25 also reads the value of pointer 4 stored at the back of Length 4. The CPU 25 moves the data pointer on the basis of the value of pointer 4. Then, the CPU 25 reads data (Value 4) defined by the number of bytes, indicated by Length 4, from the position the data pointer indicates.

The CPU 25 generates response data from the value of Value thus read. The CPU 25 transmits the response data to the card reader/writer 14 through the communication unit 24.

As stated above, this embodiment can be practiced even if Value of the higher TLV data object contains a plurality of lower TLV objects. In addition, the CPU 25 can shorten the time required for retrieving TLV data objects. As a result, a portable electronic apparatus and a method of controlling the portable electronic apparatus can be provided, in which processes can be efficiently performed in response to commands.

The TLV data objects stored in the file may differ in the data length of Length. In this case, the nonvolatile memory 28 stores such data as shown in FIG. 6.

FIG. 6 is a diagram explaining still another process performed in the IC card 2 of FIG. 2. If the TLV data objects to be written in the file differ in the length of Length, the CPU 25 of the IC card 2 writes such data as shown in FIG. 6.

If the IC card 2 receives a command for writing a TLV data object, the CPU 25 writes Length and Value of the TLV data object in the second storage area 28b. In this case, Value is written immediately after Length.

Further, the CPU 25 writes Tag of the TLV data object in the first storage area 28a. Moreover, the CPU 25 writes address for specifying the position where Length and Value of the TLV data object have been written, in first storage area 28a and immediately after Tag.

Assume that Tag and length of address of the TLV data object stored in the first storage area 28a have fixed lengths, respectively. The number of bytes constituting Tag and the number of bytes constituting the pointer are stored, as attribute data, in the file held in the nonvolatile memory 28. Further, the data showing that the file hold a TLV data object having an unfixed length is also stored, as attribute data, in the nonvolatile memory 28.

To select a file, the CPU 25 confirms the attribute data held in the file. The CPU 25 can therefore recognize that the file holds a TLV data object having an unfixed length. Further, the CPU 25 examines the attribute data, determining the lengths of Tag and address.

The CPU 25 of the IC card 2 in which the nonvolatile memory 28 stores the data shown in FIG. 6 may receive, from the IC card processing apparatus 1, a GET DATA command designating "A5." In this case, the CPU 25 retrieves TLV data object whose Tag value is "A5."

The CPU 25 reads Tag 1 from the head of the file. Then, the CPU 25 collates the value of Tag 1 with the value of the designation data. As shown in FIG. 6, Tag 1 has value "88," and the designation data has value "A5." Therefore, the CPU 25 determines that the value of Tag 1 is not equal to that of the designation data.

The CPU 25 therefore moves the data pointer to the next tag, i.e., Tag 2. That is, the CPU 25 does not read Length 1, on the basis of the length of Length previously recognized.

The CPU 25 then reads Tag 2. The CPU 25 collates the value of Tag 2 with the value of the designation data. As shown in FIG. 6, Tag 2 has value "50," and the designation data has value "A5." The CPU 5 therefore determines that the value of Tag 2 is not equal to that of the designation data.

In this case, the CPU 25 moves the data pointer to the next tag, i.e., Tag 3. That is, the CPU 25 does not read pointer 2 stored immediately after Tag 2, on the basis of the length of the address, which has been previously recognized.

Next, the CPU 25 reads Tag 3. The CPU 25 collates the value of Tag 3 with the value of the designation data. As shown in FIG. 6, Tag 3 has value "A5," and the designation data has value "A5." The CPU 5 therefore determines that the value of Tag 3 is equal to that of the designation data.

In this case, the CPU 25 reads the value of pointer 3 stored at the back Tag 3. The CPU 25 moves the data pointer on the basis of the value of pointer 3. Then, the CPU 25 reads data (Value 3) defined by the number of bytes, indicated by Length 3, from the position the data pointer indicates.

The CPU 25 generates response data from the value of Value thus read. The CPU 25 transmits the response data to the card reader/writer 14 through the communication unit 24.

As described above, the CPU 25 of the IC card 2 according to this embodiment stores Tag and the address in the first storage area 28a, and stores Length and Value in the second storage area 28b. Tag and the address, both stored in the first storage area 28a, can therefore have prescribed lengths, respectively.

The CPU 25 can therefore automatically determine the position at which Tag is stored in the first storage area 28a. That is, the CPU 25 can easily specify the position where Tag is stored, in order to retrieve Tag in accordance with the data the command designates.

Therefore, the CPU 25 can shorten the time required for retrieving TLV data objects. As a result, a portable electronic apparatus and a method of controlling the portable electronic apparatus can be provided, in which processes can be efficiently performed in response to commands.

Tag of any TLV data object stored in the file may not have a fixed length. In this case, the nonvolatile memory 28 stores such data as shown in FIG. 7.

FIG. 7 is a diagram explaining another process performed in the IC card 2 of FIG. 2.

If the TLV data objects to be written in the file differ in the length of Tag, the CPU 25 of the IC card 2 writes such data as shown in FIG. 7.

If the IC card 2 receives a command for writing a TLV data object, the CPU 25 writes Length and Value of the TLV data object in the second storage area 28b. In this case, the CPU 25 writes Value immediately after Value.

Further, the CPU 25 writes Tag of the TLV data object in the first storage area 28a. Moreover, the CPU 25 writes address for specifying the position where Length and Value of the TLV data object have been written, in first storage area 28a and immediately after Tag.

In this case, the CPU 25 adjusts the length of Tag to be written in the first storage area 28a, to the length of the longest Tag. Assume that three TLV data objects have Tag "9F 38," Tag "9F 27" and Tag "A5," respectively, as shown in FIG. 7. Then, the CPU 25 sets the length of Tag to two bytes, in order to write these TLV data objects in first storage area 28a.

Then, the CPU 25 performs a write process, writing Tag "A5" of the TLV data object having a 2-byte Tag length, as "A5 (NULL)." That is, the CPU 25 first adds a blank (NULL) to Tag shorter than a prescribed length, and then writes the tag. The CPU 25 thus adjusts the length of Tag to be written in the first storage area 28a, to the prescribed length.

It is here assumed that the address stored in the first storage area 28a has the prescribed length. The CPU 25 stores the lengths of Tag and pointer, as attribute data, in the file held in the nonvolatile memory 28.

To select a file, the CPU 25 confirms the attribute data held in the file. The CPU 25 can therefore recognize the lengths of Tag and address, both held in the file.

The CPU 25 of the IC card 2 in which the nonvolatile memory 28 stores the data shown in FIG. 7 may receive, from the IC card processing apparatus 1, a GET DATA command designating "A5." In this case, the CPU 25 retrieves TLV data object whose Tag value is "A5."

The CPU 25 reads Tag 1 from the head of the file. Then, the CPU 25 collates the value of Tag 1 with the value of the designation data. As shown in FIG. 7, Tag 1 has value "9F 38," and the designation data has value "A5." Therefore, the CPU 25 determines that the value of Tag 1 is not equal to that of the designation data.

The CPU 25 therefore moves the data pointer to the next tag, i.e., Tag 2. That is, the CPU 25 does not read pointer 1 existing immediately after Tag 1, on the basis of the length of the address recognized.

The CPU 25 then reads Tag 2. The CPU 25 collates the value of Tag 2 with the value of the designation data. As shown in FIG. 7, Tag 2 has value "9F 27," and the designation data has value "A5." The CPU 5 therefore determines that the value of Tag 2 is not equal to that of the designation data.

In this case, the CPU 25 moves the data pointer to the next tag, i.e., Tag 3. That is, the CPU 25 does not read pointer 2 stored immediately after Tag 2, on the basis of the length of the address, which has been previously recognized.

Next, the CPU 25 reads Tag 3. The CPU 25 collates the value of Tag 3 with the value of the designation data. As shown in FIG. 7, Tag 3 has value "A5," and the designation data has value "A5." The CPU 5 therefore determines that the value of Tag 3 is equal to that of the designation data.

In this case, the CPU 25 reads the value of pointer 3 stored at the back Tag 3. The CPU 25 moves the data pointer on the basis of the value of pointer 3. Then, the CPU 25 reads Length 3 from the position the data pointer indicates. Further, the CPU 25 reads data (Value 3) defined by the number of bytes, indicated by Length 3.

The CPU 25 generates response data from the value of Value thus read. The CPU 25 transmits the response data to the card reader/writer 14 through the communication unit 24.

As described above, the CPU 25 of the IC card 2 according to this embodiment performs a write process, adjusting the length of Tag to be written in the first storage area 28a, to the length of the longest Tag. Tag can therefore written in units of a specific number of bytes, even if the TLV data objects to be written in the first storage area 28a differ in the length of Tag.

The CPU 25 can therefore automatically determine the position at which Tag is stored in the first storage area 28a. That is, the CPU 25 can easily specify the position where Tag is stored, in order to retrieve Tag in accordance with the data the command designates.

Therefore, the CPU 25 can shorten the time required for retrieving TLV data objects. As a result, a portable electronic apparatus and a method of controlling the portable electronic apparatus can be provided, in which processes can be efficiently performed in response to commands.

Assume conventional TLV data objects are is held in the file stored in the nonvolatile memory 28. Then, Tag of one TLV data object is stored immediately after Value of the preceding TLV data object. This makes the problem that any data to be updated cannot be stored if it is longer than Value already stored.

In this embodiment, the storage area for holding Tag and Length is spaced from the storage area for holding Value. Value can therefore be updated to longer data.

Figure 8:
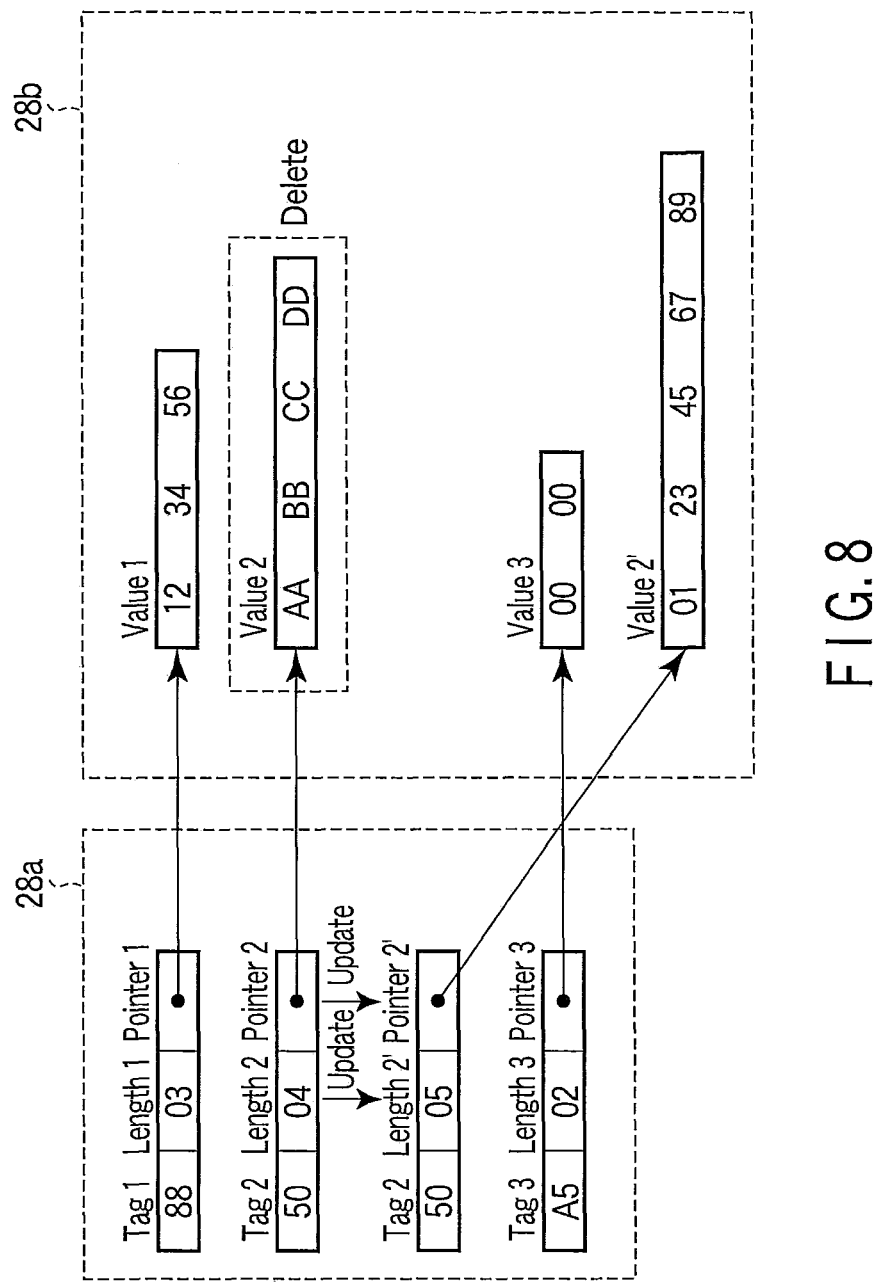
FIG. 8 is a diagram explaining an IC card according to the embodiment.

FIG. 8 is a diagram explaining how data is updated in the IC card of FIG. 2.

The IC card 2 may receive an update command for updating a designated TLV data object of a file stored in the nonvolatile memory 28. In this case, the CPU 25 of the IC card 2 first specifies the designated file. More precisely, the CPU 25 retrieves, from the nonvolatile memory 28, the TLV data object having Tag identical to the designation data contained in the update command.

If the designation data contained in the update command is "50," the CPU 25 retrieves Tag of the value equal to "50" from the first storage area 28a. In this case, the CPU 25 retrieves Tag identical to the designation data, performing the process explained with reference to FIG. 3. The CPU 25 can therefore determine that the designation data is identical to Tag 2 shown in FIG. 8.

In this case, the CPU 25 reads Length 2 stored at the back of Tag 2. The CPU 25 then compares the value of Length of the TLV data object to update, with the value of Length 2. If the value of Length of the TLV data object to update is greater than the value of Length 2, the CPU 25 deletes Value 2 in the second storage area 28b.

That is, the CPU 25 reads the value of pointer 2 stored right after Length 2. On the basis of the value of pointer 2, the CPU 25 moves the data pointer. The CPU 25 then deletes data (i.e., Value 2) composed of a number of bytes, equivalent to Length 2, from the position the data pointer indicates.

The CPU 25 further moves the data pointer to another address in the second storage area 28b. The CPU 25 writes Value of the TLV data object to update (i.e., Value 2') from the position of the data pointer.

The CPU 25 then rewrites the value "04" of Length 2 stored in the first storage area 28a to the value "05" of Length 2' of the TLV data object to update. Further, the CPU 25 rewrites the value of pointer 2 stored in the first storage area 28a, to the value of pointer 2' indicating the position at which Value 2' is stored.

In order to update Value already stored, to Value of a longer data length as described above, the CPU 25 of the IC card 2 according to this embodiment discards the storage area in which Value is stored. Moreover, the CPU 25 writes new Value in another part of the second storage area 28b. In accordance with new Value so written, the CPU 25 rewrites Length and pointer, both stored in the first storage area 28a.

Thus, Value already stored can be updated to Value of a longer data length. The restriction placed on the updating of TLV data objects can thereby eliminated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC Card executing a process based on command input from an external apparatus, and storing a plurality of Tag, Length, Value (TLV) data objects, the IC card comprising:
    a storage unit configured to have a first storage area that stores an unfixed-length data character of each TLV data object, and to have a second storage area that stores a fixed-length data class of each TLV data object in association with a fixed-length address representing positions of the data characters;
    a transmission/reception unit configured to transmit and receive data to and from the external apparatus; and
    a control unit configured to:
        retrieve the data class from the second storage area, the data class being identical to designation data contained in a read command for reading a TLV data object, if the read command is received by the transmission/reception unit, and
        read the data character stored in the first storage area based on the address in association with the data class retrieved,
    wherein the storage unit is configured to store in the first storage area an unfixed-length data length representing the length of the data character stored in the first storage area, in association with the data character stored in the first storage area.

2. The IC card of claim 1, wherein the storage unit is configured to store the data class in the second storage area, adjusting a data length of the data class to the data length of the longest TLV data object.

3. The IC card of claim 1, further comprising:
    an IC module including the storage unit; and
    a main body including the IC module.

4. A method of controlling an IC card executing a performing process based on command input from an external apparatus, and storing a plurality of Tag, Length, Value (TLV) data objects, the method comprising:
    storing an unfixed-length data character of each TLV data object in association with an unfixed-length data length representing the length of the data character to a first storage,
    storing a fixed-length data class of each TLV data object in association with a fixed-length address representing positions of the data characters to a second storage area;
    retrieving the data class from the second storage area, the data class being identical to designation data contained in a read command for reading a TLV data object, if the read command of the TLV data object is received; and
    reading the data character stored in the first storage area based on the address in association with the data class retrieved.

* * * * *